Patented Sept. 19, 1933

1,927,130

UNITED STATES PATENT OFFICE 1,927,130

CATALYTIC HYDROGENATION OF MONAMINES OF THE BENZENE SERIES

Wilhelm Lommel, Wiesdorf, and Theodor Goost, Leverkusen, Germany, assignors to General Aniline Works, Inc., New York, N. Y., a corporation of Delaware No Drawing. Application July 21, 1928, Serial No. 294,573, and in Germany August 6, 1927

5 Claims. (Cl. 260—128)

The present invention concerns the catalytic hydrogenation of aromatic bases.

In accordance with the invention the course of the catalytic hydrogenation of aromatic amines under superatmospheric hydrogen pressure and at elevated temperature, (the pressure and the temperature may vary within wide limits), in the presence of a hydrogenation catalyst as for instance nickel, cobalt nickeloxide, cobaltoxide and the like can be favorably influenced by adding to the hydrogenation mixtures a compound of the group comprising oxides and hydroxides of alkali and alkaline earth metals, and such salts thereof as possess basic character. Such compounds are for instance sodium carbonate, calcium oxide, alkali metal aluminates, -borates, -stannates, other alkali metal salts of weak acids, and the like. Obviously only such compounds of the group above mentioned are operable, as are not catalyst-poisons, i. e. compounds which destroy the reactivity of the catalysts. The reaction may be performed in various manners, for instance by adding the catalyst and one or more of the compounds above mentioned, to the amine to be hydrogenated (especially aniline and its homologues and substitution products), displacing the air by hydrogen and heating the mixture under superatmospheric pressure while stirring and while continuously replacing the hydrogen consumed. The temperature and pressure to be used may vary within wide limits depending upon the amine to be hydrogenated, the catalyst used and the addition to be made according to this invention but it is to be understood that in most cases the temperatures necessary for performing the hydrogenation will be lower than those required when working without the additions.

The favorable action of the addition of the compounds above mentioned is evident partly in the reduction of the reaction temperature, partly in the fact that the formation of by-products is considerably reduced and in an increased yield.

The following examples illustrate our invention without limiting it thereto, the parts being by weight:

Example 1.—100 parts of ethylaniline are heated with hydrogen in the presence of one part of nickel oxide and 0.06 part of sodium carbonate under a hydrogen pressure of about 100 atmospheres and with thorough stirring. When the temperature is maintained at about 250° C. by removing superfluous heat of reaction, the hydrogenation reaches equilibrium after about half an hour, 85% of hexahydroethylaniline being produced, the remainder consisting of unchanged ethylaniline and 2% of by-products. When working according to the same process but without the addition of sodium carbonate, the proportion of by-products increases to about 15%.

Example 2.—Proceeding as in Example 1, with the addition of calcium oxide instead of sodium carbonate causes the reaction to begin at about 190° C., the yield of hexahydroethylaniline being increased to about 98%.

Example 3.—100 parts of orthotoluidine are thoroughly mixed with 1.5 parts of cobalt oxide and about 3 parts of calcium oxide and hydrogenation is effected at a super-atmospheric hydrogen pressure advantageously of about 100 atmospheres. The reaction commences at about 200° C. When the temperature is allowed to rise to about 225–230° C. the absorption of hydrogen is practically complete after 3 hours. The yield of hexahydro-o-toluidine amounts to 93%. By working with cobalt oxide but without calcium oxide it will be found that the reaction only begins at 250–260° C. and leads to the formation of from 30–50% of by-products.

We claim:—

1. In the process of hydrogenating a monamine of the benzene series by heating the same under superatmospheric hydrogen pressure and in the presence of a hydrogenation catalyst, the step which comprises adding to the hydrogenation mixture an alkaline reacting compound of the group consisting of alkali metal- and alkaline earth metal salts of weak acids, and of oxides and hydroxides of the alkaline earth metals.

2. In the process of hydrogenating a monamine of the benzene series by heating the same under super-atmospheric hydrogen pressure and in the presence of a hydrogenation catalyst, the step which comprises adding to the hydrogenation mixture an alkaline reacting compound of the group consisting of water-soluble alkali metal- and alkaline earth metal salts of carbonic acid, acetic acid, stannic acid and boric acid, and of oxides and hydroxides of the alkaline earth metals.

3. In the process of hydrogenating o-toluidine by heating the same under super-atmospheric hydrogen pressure in the presence of cobalt oxide as hydogenation catalyst, the step which comprises adding calcium oxide to the hydrogenation mixture and then heating the mixture from about 200° to about 230° C.

4. In the process of hydrogenating a monamine of the benzene series by heating the same under super-atmospheric hydrogen pressure and in the presence of a hydrogenation catalyst, the step which comprises adding calcium oxide to the hydrogenation mixture.

5. In the process of hydrogenating a monamine of the benzene series by heating the same under super-atmospheric hydrogen pressure and in the presence of a hydrogenation catalyst, the step which comprises adding sodium carbonate to the hydrogenation mixture.

WILHELM LOMMEL. [L. S.]
THEODOR GOOST. [L. S.]